US009229442B2

(12) United States Patent
Kaminski et al.

(10) Patent No.: US 9,229,442 B2
(45) Date of Patent: Jan. 5, 2016

(54) IN-PROCESS COMPENSATION OF MACHINING OPERATION AND MACHINE ARRANGEMENT

(71) Applicant: AKTIEBOLAGET SKF, Göteborg (SE)

(72) Inventors: Jacek Kaminski, Mölnlycke (SE); Stefan Högnäs, Svaneholm (SE); Oscar A. Neguembor, Hindås (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/347,466

(22) PCT Filed: Sep. 21, 2012

(86) PCT No.: PCT/SE2012/000144
§ 371 (c)(1),
(2) Date: Mar. 26, 2014

(87) PCT Pub. No.: WO2013/043102
PCT Pub. Date: Mar. 28, 2013

(65) Prior Publication Data
US 2014/0256228 A1 Sep. 11, 2014

(30) Foreign Application Priority Data
Sep. 22, 2011 (SE) ...................................... 1100694

(51) Int. Cl.
*B24B 1/00* (2006.01)
*B23B 51/14* (2006.01)
*G05B 19/404* (2006.01)

(52) U.S. Cl.
CPC ........... *G05B 19/404* (2013.01); *B23B 2215/12* (2013.01); *B23B 2228/24* (2013.01);
(Continued)

(58) Field of Classification Search
CPC ........ B23Q 15/12; B23Q 15/14; B23Q 15/08; B23Q 15/18; B23Q 15/22; B23Q 15/225; B23Q 15/24; B23Q 17/005; B23Q 17/09; B23Q 17/22; B24B 1/00; B24B 37/042; B24B 37/04; B24B 41/06; B24B 49/16; Y10T 409/303752; Y10T 409/303808; Y10T 409/306838; Y10T 409/306832; Y10T 409/306888; Y10T 409/306944; Y10T 409/307228; Y10T 409/30728; Y10T 409/307336; Y10T 409/308008; Y10T 409/308064; B23B 2250/04; B23B 2250/08; B23B 2250/16
USPC ................................ 451/5, 11, 28; 82/48, 119
See application file for complete search history.

(56) References Cited

U.S. PATENT DOCUMENTS 3,589,077 A * 6/1971 Lenning ........................... 451/26
3,634,976 A * 1/1972 Hahn et al. ......................... 451/5
(Continued)

FOREIGN PATENT DOCUMENTS

| DE | 4228333 A1 | 3/1993 |
| DE | 4401496 A1 | 8/1995 |
| DE | 19958616 A1 | 6/2001 |

*Primary Examiner* — George Nguyen
(74) *Attorney, Agent, or Firm* — Bryan Peckjian; SKF USA Inc. Patent Dept.

(57) ABSTRACT

The present invention relates to a method for performing in-process compensating a machining operation on a workpiece, wherein the compensation process includes generating a control signal representative of magnitude of a contact force exerted on a cutting tool in a normal direction in relation to a machining surface of the workpiece, determining a compensation parameter value based on the control signal, and compensating the machining operation based on the compensation parameter value. The present invention also relates to corresponding machine arrangement for performing a machining operation on a workpiece, such as a hard turning process.

14 Claims, 8 Drawing Sheets

(52) U.S. Cl.
CPC ............... *G05B2219/37374* (2013.01); *G05B 2219/49099* (2013.01); *G05B 2219/49168* (2013.01); *G05B 2219/49169* (2013.01); *G05B 2219/49184* (2013.01); *G05B 2219/49186* (2013.01)

(56) References Cited

U.S. PATENT DOCUMENTS

| | | | | |
|---|---|---|---|---|
| 3,699,720 A | * | 10/1972 | Lenning | 451/8 |
| 3,855,736 A | * | 12/1974 | Porter, Jr. | 451/5 |
| 3,897,659 A | * | 8/1975 | Henry | 451/5 |
| 4,053,289 A | * | 10/1977 | Tatsumi | 451/28 |
| 4,071,980 A | * | 2/1978 | Kubo | 451/5 |
| 4,074,467 A | * | 2/1978 | Robillard | 451/26 |
| 4,100,700 A | * | 7/1978 | Peirce et al. | 451/5 |
| 4,117,634 A | * | 10/1978 | Sugita et al. | 451/28 |
| 4,559,600 A | * | 12/1985 | Rao | 700/175 |
| 4,584,915 A | * | 4/1986 | Ichiyanagi et al. | 82/19 |
| 4,627,196 A | * | 12/1986 | Veale | 451/28 |
| 4,637,169 A | * | 1/1987 | Sigg | 451/11 |
| 4,698,773 A | * | 10/1987 | Jeppsson | 700/160 |
| 4,833,617 A | * | 5/1989 | Wang | 700/173 |
| 4,860,500 A | * | 8/1989 | Thompson | 451/11 |
| 4,864,904 A | * | 9/1989 | Mishiro | 82/137 |
| 4,899,094 A | * | 2/1990 | Pilborough | 318/567 |
| 5,033,237 A | * | 7/1991 | Slough et al. | 451/5 |
| 5,072,550 A | * | 12/1991 | Matsumoto | 451/51 |
| 5,127,778 A | * | 7/1992 | Scheer | 409/132 |
| 5,177,901 A | * | 1/1993 | Smith | 451/72 |
| 5,193,953 A | * | 3/1993 | Jesinger | 409/231 |
| 5,261,768 A | * | 11/1993 | Loucks et al. | 409/80 |
| 5,441,437 A | * | 8/1995 | Hulstedt | 451/1 |
| 5,509,847 A | * | 4/1996 | Jinno et al. | 451/11 |
| 5,957,016 A | * | 9/1999 | Segalman et al. | 82/1.11 |
| 6,149,506 A | * | 11/2000 | Duescher | 451/59 |
| 6,234,881 B1 | * | 5/2001 | Martin, Jr. | 451/205 |
| 6,390,888 B1 | * | 5/2002 | Amano et al. | 451/24 |
| 6,450,859 B1 | * | 9/2002 | Moyer | 451/5 |
| 6,916,229 B2 | * | 7/2005 | Kao et al. | 451/58 |
| 8,550,876 B2 | * | 10/2013 | Demers | 451/28 |
| 9,010,463 B2 | * | 4/2015 | Webb et al. | 175/384 |
| 2010/0120337 A1 | * | 5/2010 | Kuriyama et al. | 451/61 |
| 2013/0024021 A1 | * | 1/2013 | Atabey | 700/176 |

* cited by examiner

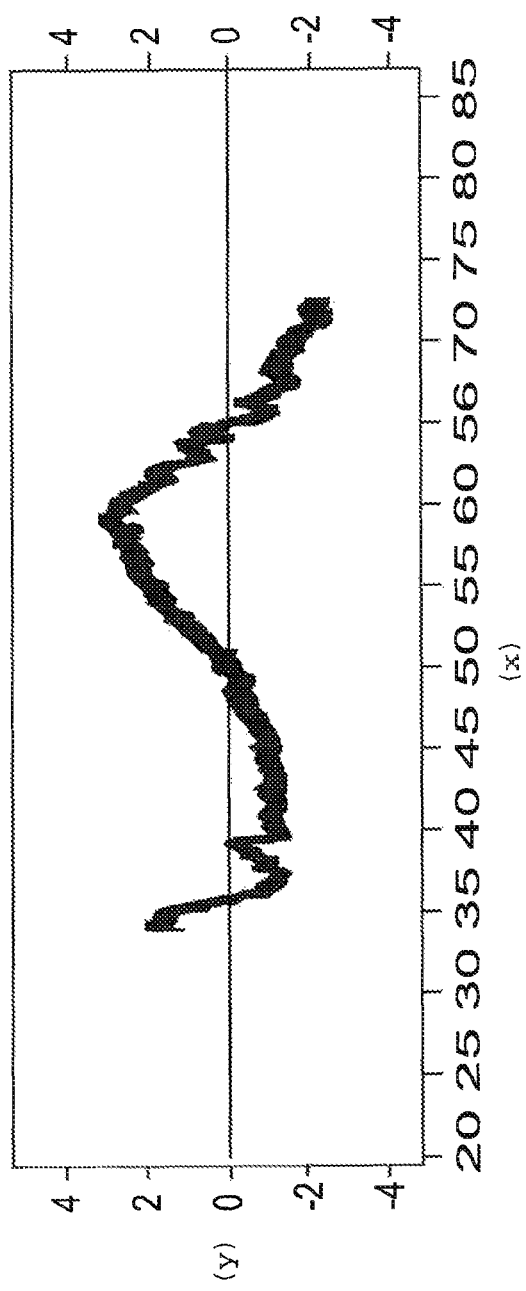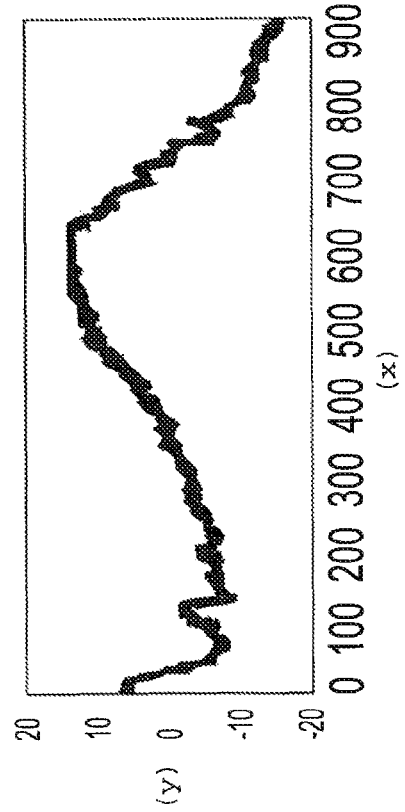
Fig. 4

IN-PROCESS COMPENSATION OF MACHINING OPERATION AND MACHINE ARRANGEMENT

CROSS REFERENCE

This application is U.S. national stage of International Application No. PCT/Se2012/000144filed on Sep. 21,2012, which claims priority to Swedish Patent Application No. SE1100694-7 filed on Sep.22, 2011.

FIELD OF THE INVENTION

The present invention relates to a method and a machine arrangement for performing machining operation on a workpiece, wherein the machining operation comprises physically removing material from the workpiece by subjecting a machining surface of the workpiece with a cutting tool, and by providing a relative rotational movement and a relative translational movement between the workpiece and the cutting tool. For example, the invention may be used for turning, hard turning, and boring (inside turning) of e.g. metal or ceramic components, using e.g. a lathe or automatic lathe based on manual, semi-automated, or automated machining operations. Machining operations may for example be based on CNC (computer numerical control), wherein commands are passed to e.g. a machine tool arranged to perform machining operation based on CNC parameters.

BACKGROUND ART

Various high performance and high quality metal, steel, or ceramic components, such as bearing components, rods, axles, shafts, couplings, engine members, etc., may be manufactured from a workpiece using a turning process. The turning process involves a machining operation which physically removes material from a machining surface of the workpiece with a cutting tool, often comprised of a replaceable tool insert or tip, such as a carbide, CBN, or ceramic insert. Material removal during the machining operation is achieved by providing a relative rotational movement between the workpiece and the cutting tool, contacting a machining surface of the workpiece with a tip of the cutting tool, and moving the cutting tool in relation to the workpiece such that a suitable amount of material is removed during each revolution of the turning process.

In order to achieve proper high quality properties of the components, such as high dimensional accuracy, such as roundness and cylindricity which are critical factors, further treatment involving e.g. grinding and/or honing manufacturing steps are commonly utilized. Additional manufacturing steps, however, require additional machinery and increase manufacturing time and complexity as well as cost. Hence, in order to facilitate the manufacturing, it is desired to improve the quality of the final cut of the components from the machining operation such that subsequent manufacturing steps for achieving the intended dimension and surface finishing of the component may be reduced, or avoided. In particular, this applies to hard turning manufacturing wherein the machining operation is performed on a component workpiece which has the hardness required by the final component application, such as a rolling bearing application in the case of a bearing ring or rolling body component.

Machining operations, however, involve highly complex interactions between the cutting tool and machining surface of the workpiece, which, during the manufacturing process, impede the accuracy and properties of the finalized component. For example, initial workpiece distortions, e.g. from hardening processes, as well as an initial high level of surface roughness and dimensional inaccuracy of the machining surface to be processed, have a negative effect on the machining results. Furthermore, essentially stochastic, and/or uncontrollable, turning processes relating to the cutting tool, such as chipping, fracturing, wear, build-up edge, etc., affect the final cut by e.g. increasing the profile error of the machined component. This leads to that the final quality and performance of the component is compromised, and that manufacturing productivity is hampered.

Hence, there exists a need to improve current techniques and to achieve manufacturing processes and machining equipment capable of providing improved and more efficient machining operations, higher productivity and improved components with increased dimensional accuracy and surface properties.

SUMMARY OF THE INVENTION

In view of the above-mentioned and other drawbacks of the prior art, a general object of the present invention is to alleviate the above mention drawbacks by providing improved, more efficient, and dimensionally more accurate manufacturing involving machining operation of a workpiece, and an improved machine arrangement for machining operation of a workpiece.

According to a first aspect thereof, the present invention relates to a method for compensating a machining operation on a workpiece, which method comprises performing a machining operation which physically removes material from the workpiece by subjecting a machining surface of the workpiece with a cutting tool, and by providing a relative rotational movement and a relative movement, e.g. a relative translational movement, between the workpiece and the cutting tool, wherein the method further comprises in-process compensation of the machining operation, which compensation comprises generating a control signal representative of magnitude of a contact force exerted on the cutting tool in a normal direction in relation to the machining surface, determining a compensation parameter based on the control signal, and compensating the machining operation based on the compensation parameter.

Advantageously, the present invention realizes improved machining operation of a workpiece by enabling in-process compensation of the machining operation. In particular, the in-process compensation allows for increased accuracy of the machining operation based on real time information which is measured during the manufacturing process of a specific workpiece. Components of improved quality may be manufactured in a more durable and efficient process, wherein the number of discarded products, e.g. due to manufacturing defects and/or imperfections, may be considerably reduced. Furthermore, the method for in-process compensation enables more flexible and versatile manufacturing of different components and components having different shapes using the same machine arrangement. Hence, after the machining operation, cumbersome and expensive after-treatment processes, such as grinding, etc., may be considerably reduces, or avoided. Also, different after-treatment machine devices and different machine configurations for different component manufacturing lines may be reduces, or avoided. Instead, according to the present method of compensating the machining operation, the same process and machine arrangement may be utilized for manufacturing varying components of high quality, all of which meet e.g. specific form error and surface roughness requirements, etc. Hence, by enabling efficient compensation of the machining operation, components which have sufficiently accurate dimensional and form properties may be manufactured directly in e.g. an automated turning, or hard turning, manufacturing process.

The present invention is based on a realization that form errors and manufacturing imperfections arising from the highly complex and stochastic interactions between a cutting tool and the machining surface of a workpiece during a machining operation, may be reduced and compensated for directly during the manufacturing process. This is advantageously realized by compensating the cutting tool during machining operation in relation to a measured magnitude of the contact force exerted on the cutting tool in a normal direction in relation to the machining surface. In other words, it has been realized by the inventors that the dimensional accuracy of the machining operation may be considerably increased in an efficient process by utilizing the correlation between the measured force exerted on the cutting tool in the normal direction of the machining surface, i.e. the normal force, and a measured form profile of a finished product manufactured without in-process compensation. For example, according to an exemplifying embodiment of the method, an incremental increase of the normal force exerted on the cutting tool is measured and indicated by the generated control signal which is used for determining the compensation parameter, wherein the machining operation is suitably compensated based on the determined compensation parameter by adjusting the position of the cutting tool in relation to the workpiece. In particular, the cutting tool may be adjusted in relation to the workpiece such that any deflections of any part of the machine arrangement, due to the increased normal force, is counteracted in such a manner that the cutting tool tip is maintained in the correct relative position in relation to the workpiece and machining surface during the machining, or cutting, operation.

Increased normal force which acts on the cutting tool during machining operation may arise from dimensional inaccuracy or material imperfections of the original workpiece, such as the thickness of the material to be removed from the workpiece. As an example, increased thickness of the material to be removed, typically measured in relation to a theoretical desired final dimension of the workpiece after machining operation, increases the normal force exerted on the cutting tool which generates a non-desired deflection of the cutting tool, tool holder, and/or the complete machine arrangement and any additional machine support devices, such as a lathe revolver or ram device. The generated deflection causes a non-desired movement of the cutting tool tip such that the tip is moved away from its correct cutting position in relation to the theoretical desired final dimension of the workpiece. However, according to the method of the present invention, the deflection occurring during the machining operating is measured and compensated such that the cutting tool is continuously, during the process, maintained in a correct position within a permitted tolerance limit in relation to predetermined operational properties and characteristics, such that a component having the intended form, dimensional accuracy, and surface properties, is realized. In addition, the normal force exerted on the cutting tool may also be affected by wearing of the cutting tool during the machining operation, such as chipping, fracturing, wear, edge build-up, etc. Hence, wearing of the cutting tool may advantageously be compensated according to the present invention during operation.

The realization by the inventors of the correlation between the normal force and occurring form error during non-compensated machining operation is particularly advantageous in that it enables a durable and efficient method for compensating machining operation in a direct and advantageous manner, wherein the complexity of the interaction between the cutting tool and the machining surface which influence the machining performance is advantageously reduced to a simplified, detectable, and highly controllable control signal representative of magnitude of the normal force.

The in-process compensation of the machining operation may, according to various embodiments, be controlled by e.g. the main control system, or main algorithm, of an automated lathe, or turning machine arrangement. In other words, the actual control parameter, or algorithm, which controls the machining operation, such as the movement of the cutting tool according to a predetermined cutting profile, may be compensated such that any measured differences in the normal force are counteracted. For example, the in-process compensation may involve adjusting CNC operational code in real time. The in-process compensation may also be performed by a separate sub-control system and/or a separate actuator device which operates independently from, or jointly with, the main machining operation or main control system. The actuator may for instance be arranged to actuate the cutting tool in relation to the workpiece and the main revolver, or ram, of the lathe, based on the control signal. Furthermore, according to an exemplifying embodiment, the in-process compensation of the machining operation may be configured to adjust the main control parameters of the machining operation and a separate sub-control system in combination.

According to various embodiments of the present invention, machining operation may comprise rotating the workpiece in relation to a cutting tool which may be essentially fixed, moved in a translational direction in relation to the rotational axis of the workpiece, or moved freely, e.g. according to an intended profile curve in relation to the workpiece. Alternatively, relative rotational movement may also be achieved by correspondingly rotating the cutting tool in relation to the workpiece, or rotating both the workpiece and the cutting tool in relation to each other.

In-process compensation of machining operation may e.g. be realized according to the present invention for turning operations comprising, but not limited to, longitudinal turning/facing, profiling, facing, plunging, or grooving, and boring of various components, such as bearing components, rods, axles, shafts, couplings, engine members, etc. The method may further advantageously be used for manufacturing of bearing components, such as inner/outer rings or rolling elements, wherein different bearing types and sizes have varying raceway profiles and outer dimensions. In particular, the same machine arrangement may be utilized for providing different finalized products. For example, this is advantageous for hard turning manufacturing of bearing components wherein the machining operation is performed on a hardened component workpiece which has the hardness required by the final component application, such as a rolling bearing application in the case of a bearing ring or rolling body. In other words, components made from hardened steel may be finalized essentially directly after an in-process turning operation according to different embodiments of the present invention.

According to an exemplifying embodiment of the present invention, the generated control signal in the in-process compensation is representative of the normal force exerted on the cutting tool only. In other words, essentially only the normal component of the force acting on the cutting tool from the workpiece is used for determining the compensation parameter. For example, the term essentially only the normal force component may be understood as the force component within a 5, 10, or 15 degree region, or direction cone, in relation to the actual normal direction, in any direction. Furthermore, the actual normal direction is typically defined in relation to the final theoretical desired machining surface of the workpiece since the actual final dimension and surface of the machining surface will comprise, at least on a very small level, small imperfections and roughness variations.

According to an exemplifying embodiment of the present invention, the step of compensating the machining operation comprises compensating the cutting tool in relation to the workpiece, for example by adjusting, or maintaining, the position of the cutting tool tip in relation to the workpiece or in relation to the machine arrangement. In more detail, the in-process compensation may involve small scale adjustments, wherein the deflection of the cutting tool, tool holder, and machine, is counteracted. Hence, the in-process compensation may involve adjusting the position of the tool holder in relation to the workpiece, while the cutting tool tip remains in essentially the same relative position in relation to the workpiece due to deflection of the cutting tool, tool holder, and surrounding equipment and support members.

An additional advantageous effect of the in-process compensation according to the present invention, is that lighter and more cost efficient machine arrangement may be utilized, since deflection and bending of the machine and machine support member become less of a problem since those problems may be compensated for during machining operation.

The step of compensating the cutting tool comprises, according to an exemplifying embodiment, actuating the cutting tool in relation to the workpiece in the normal direction. Hence, during operation, when e.g. a reduced normal force is detected and indicated in the generated control signal, the step of compensating the machining operation comprises adjusting the tool holder in a normal direction away from the workpiece such that the reduced deflection of the machine arrangement, due to the lowered normal force, is counteracted. In other words, during normal operation, the cutting tool, tool holder, and additional machine arrangement are deflected, or elastically compressed. However, if the normal force acting on the cutting tool reduces, the normal deflection of the cutting equipment will reduce which may lead to undesired effects, such as increased cutting depth. Hence, by adjusting the cutting tool in the normal direction towards and away from the workpiece, efficient and direct acting compensation of the machining operation is provided. Advantageously, the cutting tool and tool holder is adjusted by an actuator, e.g. a piezoelectric actuator or an amplified piezoelectric actuator, arranged to actuate the tool holder in the normal direction based on an applied control current. However, the cutting tool may also be actuated by electrical, pneumatic, and/or hydraulic actuators. For example, the actuator is driven and operated by electric energy and electric signals, such that it elongates in the normal direction by application of a control current.

According to a further exemplifying embodiment of the in-process compensation based on the normal force, the step of compensating the machining operation comprises adjusting a feed rate of the cutting tool in relation to the workpiece. Hence, a varying normal force may, during machining operation, be counteracted, such that deflection of the cutting tool is mitigated, by controlling the relative feed rate of the machining operation. Optionally, according to an exemplifying embodiment, the in-process compensation of the machining operation comprises a deflection stabilization process which comprises adjusting the instantaneous feed of the cutting tool in relation to the workpiece in the cutting path, e.g. in the tangential direction or in any other direction, while monitoring and maintaining constant the contact force exerted on the cutting tool in a normal direction in relation to the machining surface.

For example, the theoretical cutting depth, i.e. the desired cutting depth when deflection is disregarded, the feed rate in terms of millimeters per revolution, or cutting rotational speed may be adjusted. Also additional parameters relating to the feed rate are contemplated.

According to yet an exemplifying embodiment of the method, the step of determining a compensation parameter value comprises determining a deflection parameter value based on the control signal, which deflection parameter value is representative of in-process deflection of the cutting tool in relation to the workpiece, wherein the compensation parameter value is determined based on the deflection parameter value. Hence, the method allows for and involves determination of a deflection parameter based on the control signal. For example, the deflection parameter is retrieved from a stored memory of parameters values representative of deflection characteristics associated with a specific machine arrangement, and/or associated with a specific operational mode. Based on the measured normal force exerted on the cutting tool, the deflection parameter value is representative of the actual deflection associated with the undergoing machining operation and may be retrieved and used for determining the compensation parameter in real time. In other words, the deflection parameter forms a deflection fingerprint for a specific machine and/or machining operation. This advantageously allows for accurate and efficient in-process compensation based on customized information for different machines and machining operation conditions. The deflection parameter may also be determined according to a deflection algorithm which outputs the deflection parameter value based on the control signal. A general deflection algorithm may be utilized, or the algorithm may be customized for specific equipment and operational conditions.

According to yet an exemplifying embodiment, the in-process compensation steps are controlled independently from the step of performing the machining operation. This is advantageous in that the in-process compensation may be controlled faster and more accurate since it forms a separate system which mainly, or only, utilizes the control signal as input. Furthermore, the method may be utilized with, and arranged to improve, already existing machining operation without major reconfiguration of existing operational/controlling parameters.

For example, according to an exemplifying embodiment, the step of performing the machining operation is for example controlled by a machining operation control unit based on machining operation parameters, such as CNC code, and the in-process compensation steps may be controlled by a compensation control unit. Hence, controlling of the machining operation and the compensation operation may be performed simultaneously in a more efficient manner.

The workpiece may, according to a further exemplifying embodiment, be an essentially cylindrically shaped member for use as a rolling bearing component, such as a ring or a rolling body, wherein the normal direction coincides with the radial direction of the cylindrically shaped member. Furthermore, according to an exemplifying embodiment, the method is advantageously utilized in such manner that the step of compensating the machining operation compensate for profile errors, unroundness and/or ovality of the workpiece. For example, the workpiece may comprise one or a plurality of lobes projecting in the micrometer range and which contribute to making the workpiece non-round. In more detail, the lobes make the surface of the workpiece uneven such that the machining depth of the workpiece fluctuate with a frequency proportional to the rotational speed of the workpiece and the number of lobes. However, according to the present invention, the effects on the machining operation of the lobes, may be compensated by compensating the cutting tool in relation to the workpiece in correspondence to the fluctuating machining surface of the workpiece.

Moreover, the method is for example a turning process, or hard turning process which may defined as performing machining operation so a workpiece which has a Rockwell C hardness greater than 45. Typically hard turning involves machining operation which is performed after the workpiece is heat treated. For example, hard turning comprise cutting depth of about 0.05 mm to 2, or 3 mm.

According to a further aspect, or exemplifying embodiment, of the present invention, it relates to a computer program product, or device, comprising program code stored on a readable medium for performing the method according to the present invention and embodiments thereof, when said program is run on a control unit or a computer device.

According to a further aspect of the present invention, a computer readable medium embodying a computer program product for compensating a machining operation on a workpiece is provided, the computer program product comprising code configured to, when executed by a processor or computer, performing a machining operation which physically removes material from the workpiece by subjecting a machining surface of the workpiece with a cutting tool, and by providing a relative rotational movement and a relative movement between the workpiece and the cutting tool, and performing in-process compensation of the machining operation, which compensation comprises generating a control signal representative of magnitude of a contact force exerted on the cutting tool in a normal direction in relation to the machining surface, determining a compensation parameter value based on the control signal, and compensating the machining operation based on the compensation parameter value. The computer program may further, according to various exemplifying embodiments, comprise code configured operate according to the method according to the present invention, and/or embodiments thereof.

The computer readable medium may be one of a removable nonvolatile random access memory, a hard disk drive, a floppy disk, a CD-ROM, a DVD-ROM, a USB memory, an SD memory card, or a similar computer readable medium known in the art In addition, according to a further aspect of the present invention, it relates to machine arrangement for machining operation of a workpiece, which machining operation comprises physical removal of material from the workpiece, the machine arrangement comprising a workpiece holder arranged to secure and rotate the workpiece, a cutting tool attached to a tool holder, and a motion device for the tool holder, wherein the motion device is arranged provide the cutting tool in contact with a machining surface of the workpiece, and to move the cutting tool in relation to the workpiece according to machining operation parameters. The arrangement further comprises a sensor arranged to generate a control signal representative of magnitude of a contact force exerted on the cutting tool in a normal direction in relation to the machining surface, and a compensation control unit operatively connected to the sensor and arranged to determining a compensation parameter based on the control signal, wherein compensation control unit is arranged provide in-process compensation of the machining operation based on the compensation parameter. The machine arrangement is advantageous in that it enables improved, more efficient, and dimensionally more accurate manufacturing comprising machining operations. This is realized by compensating the cutting tool during machining operation in relation to a measured magnitude of the force exerted on the cutting tool in a normal direction in relation to the machining surface. Furthermore, the machine arrangement is advantageous in similar manner as described above in relation to the method for compensation of a machining operation according to the present invention.

According to an exemplifying embodiment, the sensor is a multi component piezo electric dynamometer.

For example, according to an exemplifying embodiment, the compensation control unit is arranged to adjust the machining operation parameters in real-time based on the control signal, wherein the motion device is arranged to adjust the cutting tool in relation to the workpiece based on the adjusted machining operation parameters.

According to a further aspect of the present invention, it relates to a machine arrangement for machining operation of a workpiece, which machining operation comprises physical removal of material from the workpiece, the machine arrangement comprising a workpiece holder arranged to secure and rotate the workpiece during machining operation, a cutting tool attached to a tool holder, and a motion device supporting the tool holder, wherein the motion device is arranged provide the cutting tool in contact with a machining surface of the workpiece, and to move the cutting tool in relation to the workpiece according to machining operation parameters. The machine arrangement further comprises an actuator device supporting the tool holder, which actuator is arranged between the motion device and the tool holder, wherein the actuator is arranged to adjust the position of the tool holder in relation to the motion device. This aspect is advantageous in that it allows for improved controlling of the cutting tool in relation to the workpiece during machining operation, wherein the cutting tool may be controlled in relation to the motion device. For example, the actuator may be used for in-process compensation, or used for actively controlling the machining operation in order to provide e.g. surface properties, such as certain regions of machined surface with increased or reduced friction, or lubrication, properties. Furthermore, the machine arrangement is advantageous in similar manners as described above in relation to the method according to the present invention.

According to an exemplifying embodiment of the machine arrangement, the actuator is arranged to actuate the cutting tool in relation to the workpiece in the normal direction. The actuator may for example have a working range within, or less than, 500, 100, 50, 25, 15, 10, 5, or 1 micron. The actuator may also be arranged to operate in a range between 0.1 and 500 microns, or between 0.2 and 20 microns, or between 0.5 and 10 microns. Hence, the actuator may be optimized for performing fast, but small, adjustments with a high frequency, e.g. up to 15, 10, 8, 6, or 4, kHz. The actuator is further advantageous in that it allows for considerably more controllable operation in relation to a regular motion device of a turning machine, in particularly due to its smaller dimension, and weight.

According to yet an exemplifying embodiment of the present invention, the machine arrangement further comprises sensor arranged to generate a control signal representative of magnitude of a contact force exerted on the cutting tool in a normal direction in relation to the machining surface, and a compensation control unit operatively connected to the sensor and arranged to determine a compensation parameter based on the control signal, wherein the actuator is arranged to, at least partly, adjust the position of the cutting tool, or the tool holder, based on the control signal.

According to an exemplifying embodiment, the sensor is a multi component piezo electric dynamometer.

For example, the sensor is arrange between the main motion device and the actuator, between the actuator and tool holder, or integrated with the actuator. Hence, the actuator and sensor form an advantageous compensation unit which allows for in-process compensation of the machining operation. In particular, the compensation unit allows for efficient compensation of deflection of the cutting tool, cutting holder, and the surrounding machine arrangement, based on the normal force exerted on the cutting tool, as measured by the sensor.

Furthermore, according to various embodiments, control means, such as the compensation control unit, may comprise a microprocessor, microcontroller, programmable digital signal processor or another programmable device. The control means may also, or instead, include an application specific integrated circuit, a programmable gate array or programmable array logic, a programmable logic device, or a digital signal processor. Where the control means includes a programmable device such as the microprocessor, microcontroller or programmable digital signal processor mentioned above, the processor may further include computer executable code that controls operation of the programmable device.

Further features of, and advantages with, the present invention will become apparent when studying the appended claims and the following description. The skilled person in the art realizes that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing exemplifying embodiments of the present invention, in which:

FIG. 4 are two schematic plots representative of the correlation between the normal force exerted on a cutting tool during non-compensated machining operation of a test component (the lower plot), and the resulting surface profile of the test component after the non-compensated machining operation (the upper plot).

DETAILED DESCRIPTION OF EMBODIMENTS OF THE INVENTION

Figure 1:
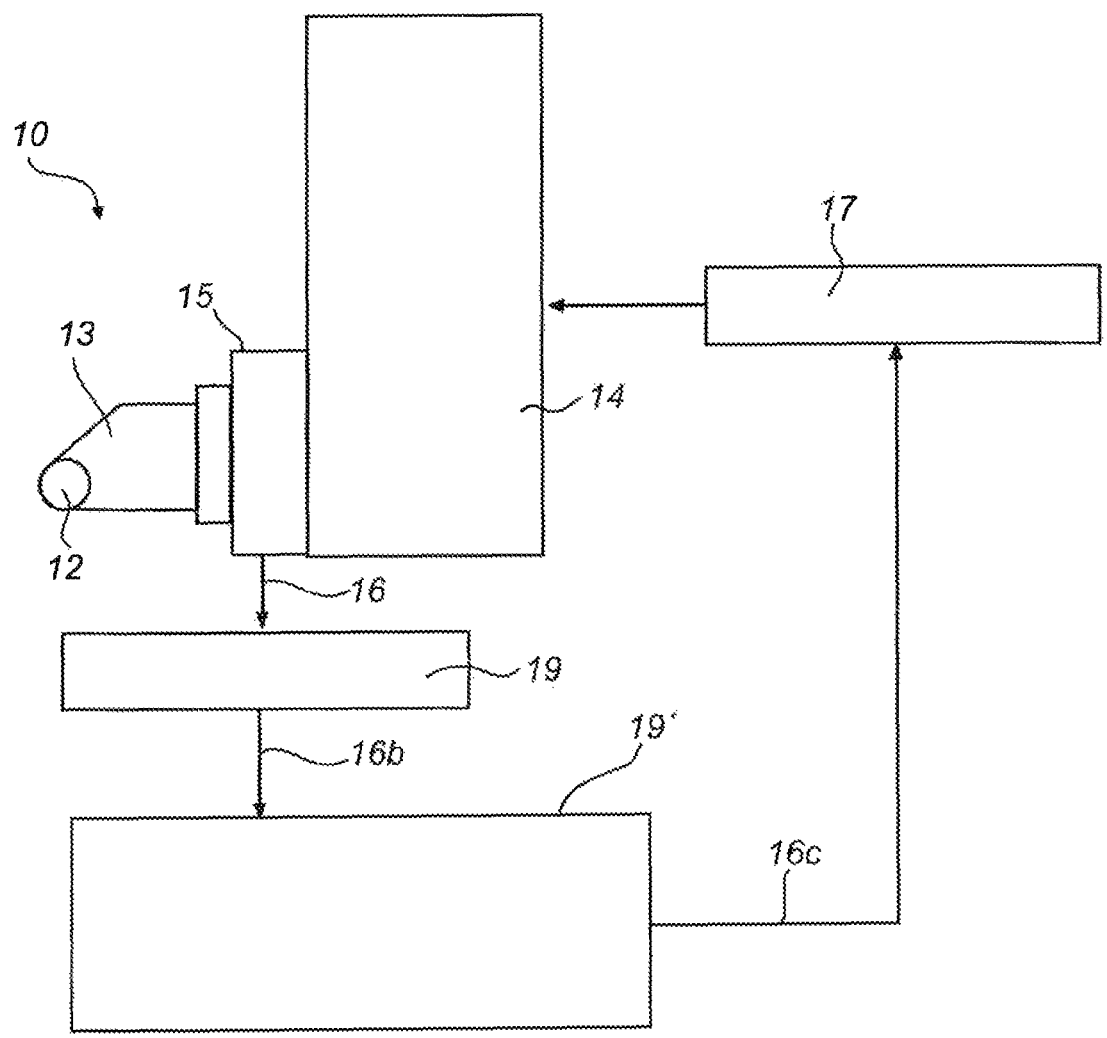
FIG. 1 is a schematic view of an exemplifying embodiment of a machine arrangement for machining operations according to the present invention, which machine arrangement comprises a sensor device.

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided for thoroughness and completeness. Like reference characters refer to like elements throughout. The drawings are merely schematic representations and may not be true to scale.

Figure 2:
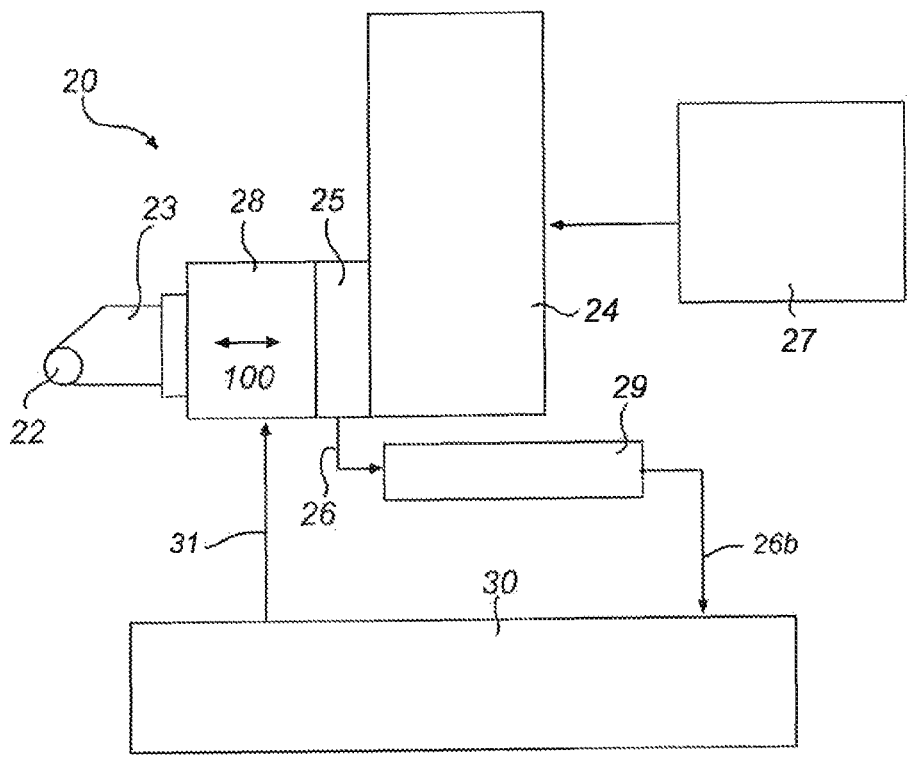
FIG. 2 is a schematic view of an exemplifying embodiment of a machine arrangement for machining operations according to the present invention, which machine arrangement comprises a sensor device and an actuator device.

In FIGS. 1 and 2, schematic views of two exemplifying machine arrangement 10 and 20 for performing machining operations according to the present invention are shown. The machine arrangements 10 and 20 each comprises a respective cutting tool 12 and 22, such as a carbide, CBN, ceramic or non-ceramic insert, and a respective tool holder 13 and 23 for supporting the cutting tool during machining operation.

With reference to FIG. 1, the tool holder 13 is securely attached to a motion device 14 typically comprising a machine revolver or ram for the purposes of moving the tool holder 13 and cutting tool 12 in relation to the workpiece. The motion device is controlled by a control system 17 which is configured to execute and control the machining operation process based on machining operation parameters.

Moreover, the machine arrangement 10 comprises a sensor, or force sensor, 15 arranged to generate a control signal 16 representative of the magnitude of the contact force exerted on the cutting tool in a normal direction in relation to a machining surface of the workpiece. As illustrated, the sensor 15 is arranged between the tool holder 13 and the motion device 14. During operation, the cutting tool 12 is maintained in cutting contact with the workpiece, wherein surface variations of the workpiece continuously, during the turning motion of the workpiece in relation to the cutting tool, give rise to a varying normal force between the cutting tool and the workpiece, which normal force is measured by the sensor 15.

The machine arrangement 10 is further provided with a compensation control system for controlling the in-process compensation of the machining operation, which compensation control system comprises a sampling device 19. The sampling device 19 is connected to the sensor 15 and arranged to process, e.g. by sampling and filtering, the control signal 16 outputted by the sensor 15 into a processed control signal 16b. The compensation control system further comprises a compensation control unit 19' which is arranged to determine a compensation parameter value 16c based on the processed control signal 16b provided by the sampling device 19. As further illustrated, the compensation parameter value is provided to the control system 17 in order to provide in-process compensation by controlling and adjusting the motion device 14 such that the tip of the cutting tool is maintained in a correct configuration and cutting depth in relation to the workpiece during operation.

In FIG. 1, the compensation system comprising the sampling device 19 and the compensation control unit 19' is illustrated as separated devices. It is noted however, that e.g. the compensation unit may be integrated in an overall control system/unit of the complete machine arrangement set up, for example as a sub system of the machining operation control unit 17.

In the machine arrangement 20, which is illustrated in FIG. 2 and arranged according to the machine arrangement 10 if not stated or depicted otherwise, the tool holder 23 is supported and securely attached to a motion device 24 by a sensor 25 and an actuator 28. As illustrated, the sensor 25 and actuator are arranged between the tool holder 23 and the motion device 24. During machining operation, the motion device 24 is controlled by a control system 27 which is configured to execute and control the machining operation process based on machining operation parameters, wherein the motion device 24 actuates the cutting tool 22, the tool holder 23, the actuator 28, and the sensor 25 simultaneously as one unit according to machining operation parameters.

Moreover, as illustrated in FIG. 2, the actuator 28 is arranged to adjust the position of the tool holder 23 and the cutting tool 22 in relation to the motion device 24 independently from the actuation of the cutting unit provided by the motion device 24. Hence, the actuator allows for in-process real time compensation of the machining operation.

The machine arrangement 20 further comprises a compensation control unit 30 which is operatively connected to receive information from the sensor 25, which information is used for determining a compensation parameter. The compensation control unit 30 is operatively connected to the actuator 28, wherein the compensation parameter is used for generating an actuator control signal 31 for controlling the actuator 28.

Figures 3A, 3B:
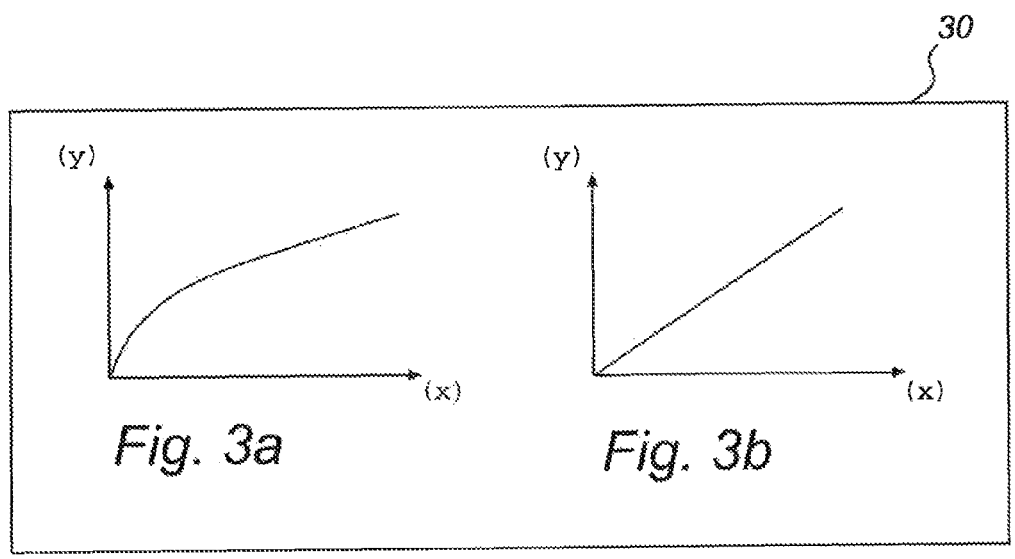
FIG. 3a is schematic plot representative of the relationship between the contact force exerted on the cutting tool in the normal direction in relation to the machining surface and the deflection of the machine arrangement, according to an exemplifying embodiment of the present invention.
FIG. 3b is schematic plot representative of the relationship between the drive current of an actuator for adjustment of the cutting tool and the elongation of the actuator, according to an exemplifying embodiment of the present invention.

In more detail, the control signal 26 from the sensor 25 is sampled and filtered by a sampling device 29 in order to generate a processed control signal 26b received by the compensation control unit 30, which processed control signal is representative of the magnitude of the contact force exerted on the cutting tool in a normal direction in relation to the machining surface. Based on the processed control signal 26b, the compensation control unit further determines a deflection parameter representative of the deflection level of the machine arrangement caused by the contact force. The deflection parameter may for example, be determined according to an algorithm, such as depicted in FIG. 3a, which is a schematic plot representative of the relationship between the contact force exerted on the cutting tool in the normal direction in relation to the machining surface, represented by the x-axis in e.g. Newton units, and the deflection of the machine arrangement, represented by the y-axis in e.g. microns.

The deflection relationship between the normal force and deflection for a particular machine arrangement, i.e. the machine force-deflection fingerprint, may be expressed as a function or as parameter values stored in a memory device accessible by the compensation control unit. For example, as illustrated in FIG. 3a, the deflection-force relationship may be modeled as a straight line, according to:

$$\text{Deflection} = C * \text{Force}$$

wherein C is a constant. The variable C may also be represented by more complex function describing the deflection-force relationship of the machine arrangement.

In a similar manner, FIG. 3b illustrates a schematic plot representative of the relationship between the actuator control signal 30, e.g. an actuator drive current, represented by the y-axis in Ampere units, and the elongation of the actuator, represented by the x-axis in e.g. micron units, which relationship may be used for determining the actuator control signal based on the deflection parameter. For example, the actuator control signal is formed by a drive current which generates a translational movement of the actuator 28, with reference to FIG. 2, in the direction 100, such that that the tool tip of the cutting tool 22 is moved in relation to the motion device 24 in order to compensate for deflection of the motion device and/or the complete machine arrangement 20.

The in-process compensation according to the present invention is based on correlation between the normal force and the measured bore profile of a turned component, at each point along the profile of the machining surface. This relationship is exemplified in FIG. 4 which illustrates two schematic plots which reveal similar patterns. In the upper plot, non-compensated bore profile variations is expressed in microns as a function of a specific length portion of the bore in mm, and in the lower plot, the measured normal force exerted on a cutting tool during the non-compensated machining operation of the component is expressed in Newton as a function of time during the machining operation of the specific length portion.

Figure 5:
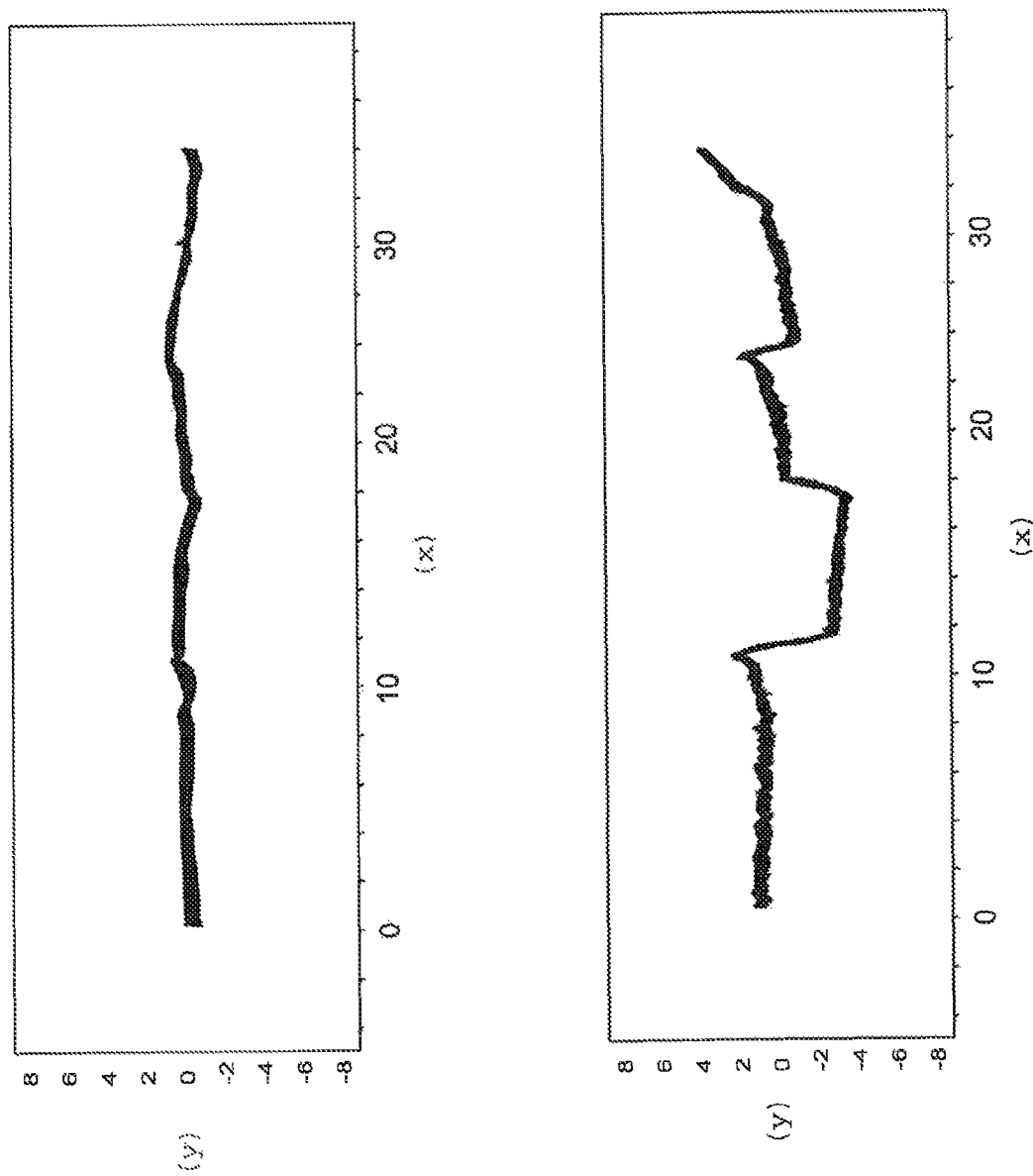
FIG. 5 are schematic plots representative of test results from non-compensated (the lower plot) and in-process compensated machining operation (the upper plot) according to an exemplifying embodiment of the present invention.

The in-process compensation according to the present invention is further exemplified in FIG. 5, which illustrates schematic plots representative of test results from non-compensated (the lower plot) and in-process compensated machining operation (the upper plot) according to an exemplifying embodiment of the present invention, where the y-axis represents the profile error curves in microns as a function of the length of the respective test components in mm, represented by the x-axis. The test components were provided with equal grooves for simulating dimensional inaccuracy of the un-processed machining surface of the test components for evaluating the machine deflection at a turning process cutting depth of 80 microns. A first groove with an approximate depth of 40 microns and length of 7 mm was provided at approximately 11 mm and a second grove with a depth of 20 microns and similar length was provided at approximately at 24 millimeters. As shown in the upper plot, the resulting error profile after machining operation comprising in-process compensation of the machine deflection due dimensional inaccuracy of the machining surface is reduced to a range of approximately ±1 microns, in relation to the resulting error profile of the non-compensated test component for which the grooves are clearly visible in the lower plot.

Figure 6:
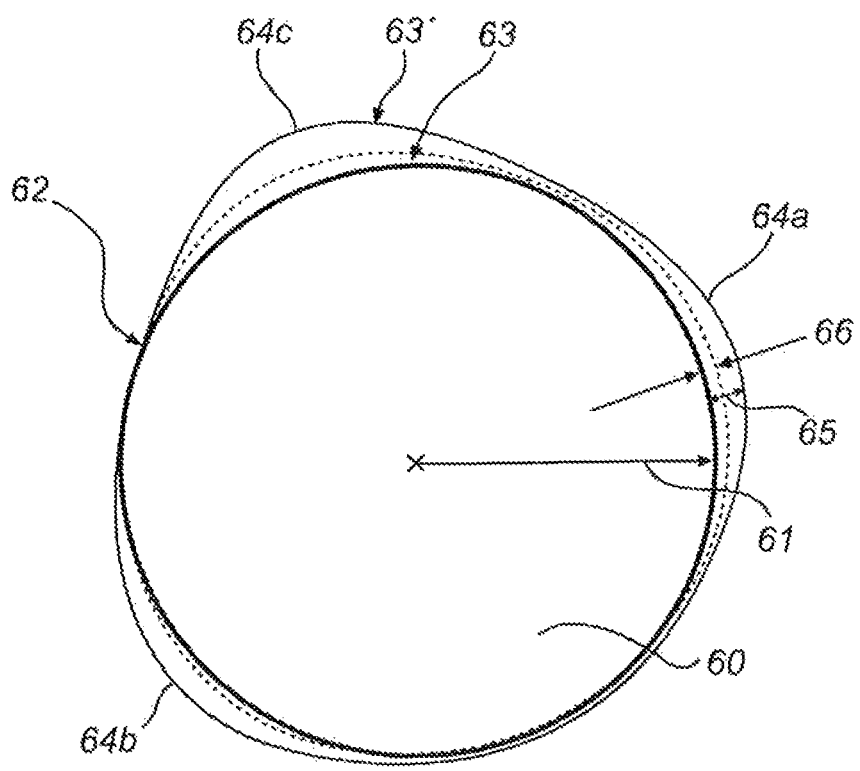
FIG. 6 is a schematic cross-section view of a work piece prior to machining operation, according to an exemplifying embodiment of the present invention.

In FIG. 6, a schematic cross-section view of a work piece 60 prior to machining operation, is shown with exaggerated dimensions. The workpiece is essentially cylindrical, but comprises a plurality of lobes 64a, 64b 64c projecting radially in the micrometer range which contribute to making the workpiece non-round. The lobes make the surface of the workpiece uneven along its circumference such that the cutting depth 65 of the workpiece, corresponding to the thickness of the material to be removed, fluctuates in relation to a theoretical desired final round dimension 62 having a radius 61. In more detail, during machining operation, the cutting depth 65 will fluctuate with a frequency proportional to the rotational speed of the workpiece and the number of lobes. This leads to that, during non-compensated machining operation, the increased cutting depth generates an increased normal force exerted on the cutting tool and the machine arrangement which will deflect radially outwards such that misalignment the tool tip of the cutting tool occurs in correspondence with the location of the lobes 64a, 64b, 64c. Hence, the actual final dimension of the workpiece 60 will have an increased radial thickness in correspondence with dotted line 63 in relation to the theoretical desired dimension 62. By utilizing the in-process compensation, however, the increased normal force exerted on the cutting tool due to the lobes 64a, 64b, 64c is identified, measured and compensated for by the in-process compensation according to the present invention.

Figure 7:
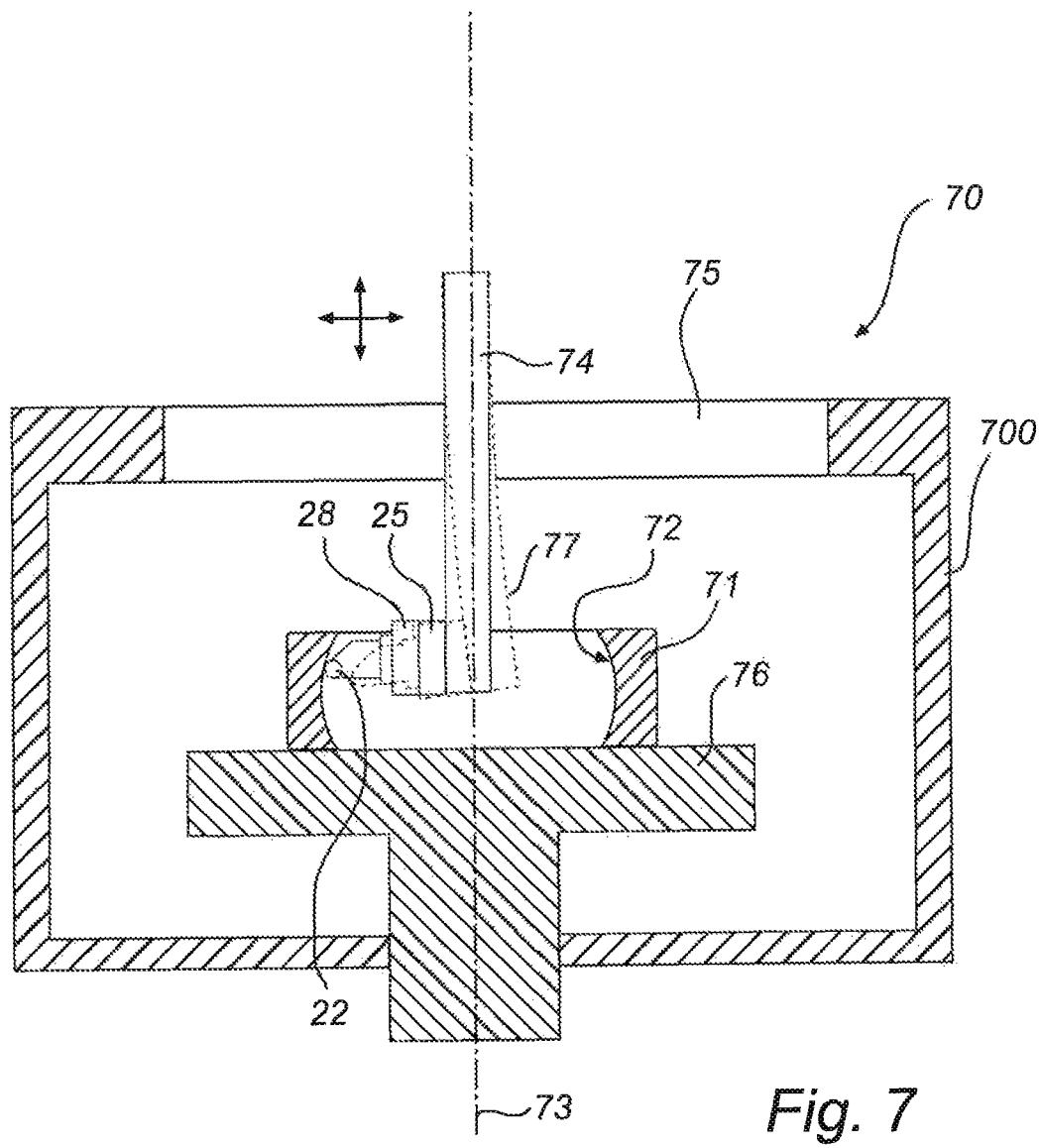
FIG. 7 is a schematic cross-sectional view of a machine arrangement for performing machining operation of a workpiece, according to an exemplifying embodiment of the present invention.

In FIG. 7, a schematic cross-sectional view of a machine arrangement 70, wherein a workpiece in the form of an outer ring 71 of a spherical bearing is subjected to boring machining operation on an inner raceway surface 72, is illustrated. The outer ring 71 is secured to and rotated by a workpiece holder 76 having a rotational axis 73. The machine arrangement 70 further comprises a motion device system arranged to actuate and support a cutting tool 22, actuator 28, and sensor 25 during the boring process. The motion device system comprises a movable support member 74 which movably arranged to a stationary support member 75 which is secured to a machine construction 700, wherein the cutting tool is actuated in relation to the workpiece by controlling the position of the moveable support member 74 in relation to the fixed support member 75 by vertical and horizontal motion. As further illustrated, the machine arrangement 70 is deflected, wherein the movable support member 74 is bend in a direction away from machining surface of the workpiece to a schematically illustrated, and highly exaggerated, deflected position 77, indicated by a dotted line.

Figure 8:
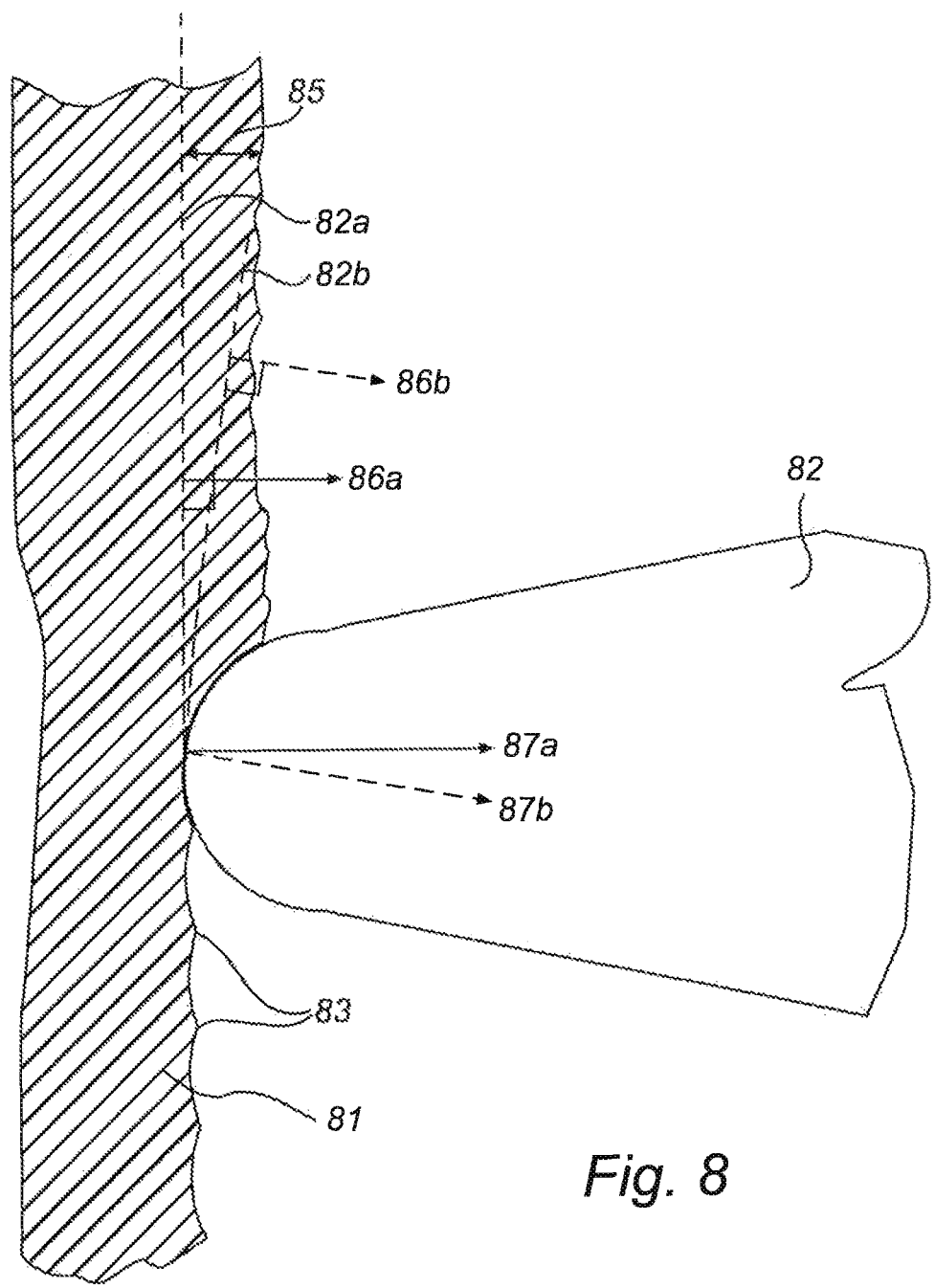
FIG. 8 is a schematic zoomed-in view of the cutting tool tip and the workpiece during machining operation, according to an exemplifying embodiment of the present invention.

With reference to FIG. 8, a schematic zoomed-in view of the cutting tool 82, its cutting tool tip and a workpiece 81 is illustrated during machining operation. The cutting tool 82 is translated along a predetermined path according to a theoretical desired final dimension 82a which corresponds to a desired machined surface. Along the predetermined, however, the cutting depth 85 corresponding to the thickness of the material to be removed varies due to dimensional variations of the outer surface of the workpiece, which will affect the force 87a exerted on the cutting tool in a normal direction 86a in relation to the desired machined surface.

An alternative predetermined cutting path corresponding to a second theoretical desired final dimension 86b is further illustrated, wherein the force 87b is exerted on the cutting tool 82 in a normal direction 86b in relation to the corresponding desired machined surface. The normal force for a given theoretical desired final dimension may be determined as the projection of the force 87b in the normal direction of that theoretical desired final dimension. Hence, according to an exemplifying embodiment, the contact force exerted on the cutting tool in a normal direction in relation to the machining surface may be determined by comparing the angle between the cutting tool and the theoretical desired final dimension of the workpiece as specified by the machining operation parameters controlling the machining operation.

Figure 9:
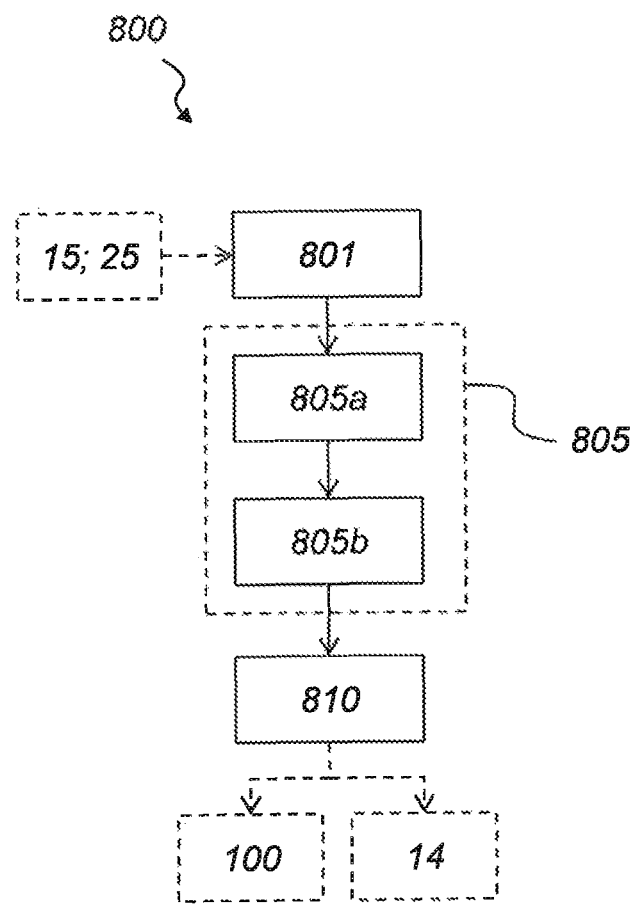
FIG. 9 illustrates a conceptual flow chart of an exemplifying embodiment of the method according the present invention.

In FIG. 9, an exemplifying embodiment of method steps according the present invention, is illustrated. In a first step 801, a control signal representative of magnitude of a contact force exerted on the cutting tool in a normal direction in relation to the machining surface is generated. For example, the control signal is based on information provided from sensor 15 or 25, as described in relation to FIG. 1 and FIG. 2, respectively. The generated control signal is further used for determining, in step 805a, a deflection parameter value associated with specific machine arrangement, wherein the deflection parameter, in turn, in used for determining, in step 805b, a compensation parameter value. Next, a control signal for compensating the machining operation, for example by providing an elongation in the 100 direction of the actuator 28 in FIG. 2, or by controlling the motion device 14 in FIG. 1, is outputted.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, method steps according to the present invention may be executed in mutually different order and are not limited to the specific implementation order as described in the exemplifying embodiments or in the claims.

Furthermore, in the claims, the word "comprising" does not exclude other elements or steps, and the indefinite article "a" or "an" does not exclude a plurality.

The invention claimed is:

1. A method for compensating a machining operation on a workpiece, the method comprising:
    performing a machining operation which physically removes material from the workpiece by subjecting a machining surface of the workpiece with a cutting tool, and by providing a relative rotational movement and a relative movement between the workpiece and the cutting tool, wherein
    the method further comprises in-process compensation of the machining operation, the in-process compensation comprising:
    providing a cutting tool holder for securing the cutting tool during operation,
    providing a motion device configured to physically drive the relative rotational movement and relative movement between the workpiece and the cutting tool;
    generating a control signal representative of magnitude of a contact force exerted on the cutting tool only in a normal direction in relation to the machining surface, the control signal being generated in response to output from a sensor configured to measure the contact force,
    determining a compensation parameter value based on the control signal, and
    compensating the machining operation based on the compensation parameter value, wherein output from the sensor is continuously monitored such that compensations in the range of zero point five microns to ten microns can be accomplished at a rate of up to fifteen thousand hertz.

2. The method according to claim 1, wherein the step of compensating the machining operation further comprises compensating the cutting tool in relation to the workpiece.

3. The method according to claim 2, wherein the step of compensating the cutting tool further comprises actuating the cutting tool in relation to the workpiece in the normal direction.

4. The method according to claim 1, wherein the step of compensating the machining operation further comprises adjusting a feed rate of the cutting tool in relation to the workpiece.

5. The method according to claim 1, wherein the step of determining a compensation parameter value further comprises determining a deflection parameter value based on the control signal, wherein
    the deflection parameter value is representative of in-process deflection of the cutting tool in relation to the workpiece, and wherein
    the compensation parameter value is determined based on the deflection parameter value.

6. The method according to claim 1, wherein the in-process compensation steps are controlled independently from the step of performing the machining operation.

7. The method according to claim 1, wherein the workpiece is a cylindrically shaped member for use as a rolling bearing component, such as a ring or a rolling body, and wherein the normal direction coincides with the radial direction of the cylindrically shaped member.

8. The method according to claim 1, wherein in the step of compensating the machining operation compensates for profile errors and/or un-roundness of the workpiece.

9. The method according to claim 1, wherein the method is a turning process, or hard turning process.

10. A computer readable medium embodying a computer program product for compensating a machining operation on a workpiece, the computer program product comprising code configured to, when executed by a processor:

perform a machining operation which physically removes material from the workpiece by subjecting a machining surface of the workpiece with a cutting tool, and by providing a relative rotational movement and a relative movement between the workpiece and the cutting tool, and perform in-process compensation of the machining operation, wherein the compensation comprises:

providing a cutting tool holder for securing the cutting tool during operation, providing a motion device configured to physically drive the relative rotational movement and relative movement between the workpiece and the cutting tool, generate a control signal representative of magnitude of a contact force exerted on the cutting tool only in a normal direction in relation to the machining surface, the control signal being generated in response to output from a sensor configured to measure the contact force, determine a compensation parameter value based on the control signal, and compensate for the machining operation based on the compensation parameter value, wherein output from the sensor is continuously monitored such that compensations in the range of zero point five microns to ten microns can be accomplished at a rate of up to fifteen thousand hertz.

11. A machine arrangement for a machining operation of a workpiece, the machining operation providing physical removal of material from the workpiece, the machine arrangement comprising:

a workpiece holder arranged to secure and rotate the workpiece, a cutting tool attached to a tool holder, and a motion device for the tool holder, wherein the motion device is arranged to place the cutting tool in contact with a machining surface of the workpiece, and to move the cutting tool in relation to the workpiece according to machining operation parameters, wherein the arrangement further comprises:

a sensor arranged to generate a control signal representative of magnitude of a contact force exerted on the cutting tool in only a normal direction in relation to the machining surface, the sensor configured to measure contact force, and a compensation control unit operatively connected to the sensor and arranged to determining a compensation parameter based on the control signal, wherein compensation control unit is arranged to provide continuous in-process compensation of the machining operation based on the compensation parameter.

12. The machine arrangement according to claim 11, wherein the compensation control unit is arranged to adjust the machining operation parameters in real-time based on the control signal, and wherein the motion device is arranged to adjust the cutting tool in relation to the workpiece based on the adjusted machining operation parameters.

13. The method of claim 1, further comprising during operation the motion device, compensates, by changing the cutting path of the cutting tool while maintaining a constant contact force on the cutting tool in the normal direction.

14. The method of claim 1, wherein separate controllers are used to carry out the machining operation and the in-process compensations to allow faster processing and control of the in-process compensations.

* * * * *